United States Patent [19]
Kakigi

[11] 4,110,690
[45] Aug. 29, 1978

[54] CHANNEL SELECTING DEVICE

[75] Inventor: Takao Kakigi, Inagi, Japan

[73] Assignee: Cybernet Electronic Corporation, Kanagawa, Japan

[21] Appl. No.: 757,671

[22] Filed: Jan. 7, 1977

[30] Foreign Application Priority Data

| Jan. 16, 1976 | [JP] | Japan | 51/4127 |
| Feb. 4, 1976 | [JP] | Japan | 51/12348 |
| Feb. 14, 1976 | [JP] | Japan | 51/16535 |

[51] Int. Cl.² .............................................. H04B 1/40
[52] U.S. Cl. ...................................... 325/25; 325/184; 325/455
[58] Field of Search ....................... 325/15, 17, 21, 22, 325/25, 184, 470, 455, 18, 191, 20, 55; 334/30, 33, 36

[56] References Cited

U.S. PATENT DOCUMENTS

| 3,835,384 | 9/1974 | Liff | 325/25 |
| 4,035,727 | 7/1977 | Ishii | 325/17 |

FOREIGN PATENT DOCUMENTS 2,332,022 1/1975 Fed. Rep. of Germany ............. 325/22

OTHER PUBLICATIONS

Translation of German Offenlegungsschrift 2332022, 9 pages.

Primary Examiner—Benedict V. Safourek
Attorney, Agent, or Firm—Oblon, Fisher, Spivak, McClelland & Maier

[57] ABSTRACT

A channel selecting device having a channel setting generator for generating channel-number increasing or decreasing signals for channel selection, a logic system provided with a channel-code generating circuit for changing the channel code according to the number of channels and a digital-number generating circuit and a time constant circuit for suspending the operation of a clock-pulse generating section for a scanner during a predetermined time, the logic system performing the one-by-one shift or continuous shift of the channel number according to the duration of signals from the channel setting means, an indicator for indicating the channel number, and a jamming wave inhibiting means for suspending the operation of a transmission circuit when given signals from the channel setting means.

3 Claims, 3 Drawing Figures

CHANNEL SELECTING DEVICE

BACKGROUND OF THE INVENTION

The present invention relates to a channel selecting device suitable for use particularly in a transceiver or the like.

When channel selection is performed by a channel selector as in the case of a transceiver, a rotary switch has usually been employed which is provided with one sliding contact and fixed contacts the number of which corresponds to that of channels. In this case, a limit is inevitably imposed on the number of channels or that of the fixed contacts, since the fixed contacts must be arranged about an axis in a circular form on a base board limited in size. When the required number of channels exceeds this limit, a plurality of switching units sufficient for meeting the required number of channels must be coaxially arranged with one on top of the other resulting in an increase of the occupied space. Moreover, in such an arrangement, contact switching is made by the rotation of a common axis and, therefore, selection of a desired channel from among the channel block of each switching unit requires discrimination of signals for clockwise and counterclockwise rotations, i.e., the increase and decrease of the channel number, resulting in an increase of complexity. In addition, the rotary type switching is inherently low in response speed.

As mentioned above, a transceiver or the like is usually so made that channel selection may be performed by operating a channel selector and, for instance, that channel scanning performed with a press-to-talk button switch of a hand microphone or the like kept depressed may unlock a frequency synthesizer of phase-locked loop type installed therein to let the synthesizer perform abnormality-preventing functions thereby preventing the transmission of jamming waves. But, such an arrangement is not necessarily able to completely eliminate abnormalities such as the transmission of jamming waves. For this reason, the advent of a new channel selecting device is eagerly hoped for that can be easily attached to the scanner of an existing transceiver or the like and in addition can completely prevent the transmission of jamming waves.

SUMMARY OF THE INVENTION

It is an object of the present invention to provide a channel selecting device which can perform the one-by-one shift and automatic quick shift of the channel number in its increasing or decreasing direction during channel selection.

It is another object of the present invention to provide a channel selecting device which can completely suspend the transmission of jamming waves during channel selection.

DESCRIPTION OF THE PREFERRED EMBODIMENTS

Now the present invention will be hereinafter described in detail with reference to the drawings.

Figure 1:
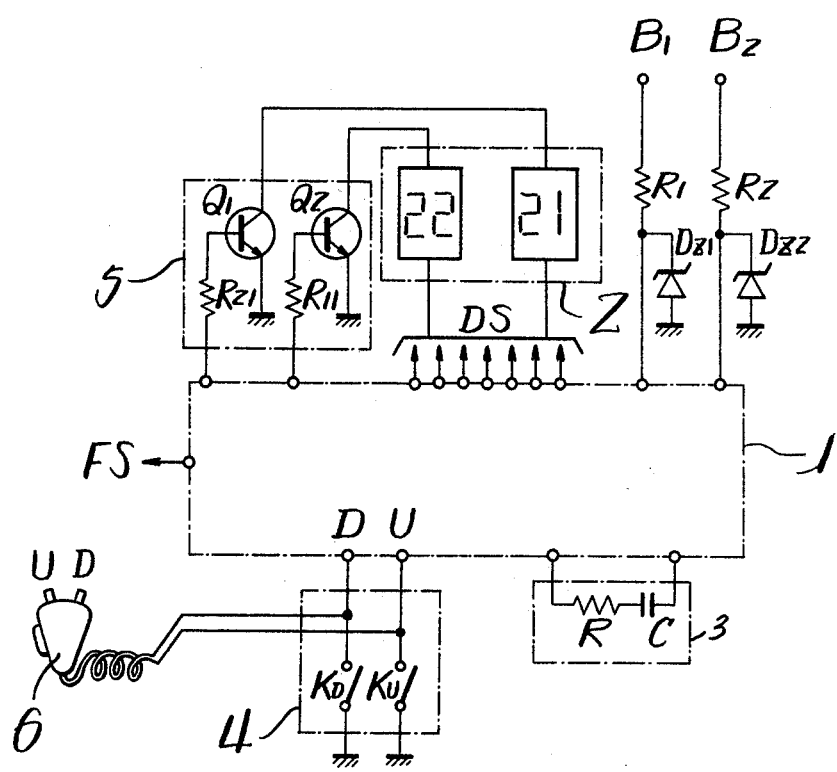
FIG. 1 is a block diagram of an example of the channel selecting circuitry according to the present invention.

Reference is first made to FIG. 1 which shows an example of the channel selecting circuitry according to the present invention. Reference numeral 1 designates a logic system containing a digital-number generating circuit for generating instruction signals for luminescence to an indicator 2 through terminals DS for the display of channel numbers and also a circuit for generating channel codes to be transmitted to an automatic frequency-control unit FS. Numeral 3 designates a time constant circuit for determining the time to initiate the operation of a clock-signal generating section provided in the logic system 1. The time constant circuit 3 is connected to an up-down counter provided in the logic system 1. Numeral 4 designates a clock-pulse generator, i.e., a means for manually setting a desired channel for channel selection. Each time when a movable contact $K_D$ is closed, the clock-pulse generator gives the logic system 1 a unit pulse signal for decreasing the channel number; and each time when a movable contact $K_U$ is closed, it gives the logic system 1 a unit pulse signal for increasing the channel number. A hand microphone 6 is connected to common signal-input terminals D and U provided between the clock-pulse generator 4 and the logic system 1, through leads provided in parallel. The microphone 6 has push buttons U' and D' for actuating channel-number increasing and decreasing switches, respectively. These switches are connected to the up-down counter in the logic system 1. The up-down counter provided in the logic system 1 is so made that, during a predetermined time set by the time constant circuit 3, counts may be outputted therefrom whose magnitude corresponds to the on-off actions of the movable contact $K_U$ or $K_D$ of the clock-pulse generator 4 performed manually, and that, after the predetermined time has elapsed, new counts are continuously outputted according to signals produced by the clock-signal generating section while the movable contact $K_U$ or $K_D$ of the clock-pulse generator 4 is closed. The indicator 2 consists of digit-indicating units 21 and 22 each formed of a plurality of segments. The indicator 2 receives instruction signals for luminescence from the digital-number generating circuit provided in the logic system 1 through the output terminals DS thereof. Numeral 5 designates a digit-changeover unit provided with transistors $Q_1$ and $Q_2$ for making or breaking connections with the digit-indicating units 21 and 22 respectively; it is positioned between the digit-indicating units 21 and 22 and the digital-number generating circuit of the logic system 1. $B_1$ designates a power source for continuously supplying power to maintain actuation of a logic memory of the digital-number generating circuit, and $B_2$ designates a power source for energizing the indicator 2 for its luminescence.

In operation, one addition or subtraction pulse causes an indication pulse to be transmitted to the indicator 2 through the digital-number generator during a predetermined time each time when the movable contact $K_U$ or $K_D$ of the clock-pulse generator is closed. Then, after the above predetermined time has elapsed, pulses are automatically and continuously transmitted at a certain frequency and digitally counted in the up-down counter thereby permitting the quick increase or decrease of the channel number, if the movable contact KU or KD is kept closed or either of the push buttons U' or D' of the hand microphone 6 is kept depressed. During the above predetermined time, therefore, clock pulses the number of which corresponds to that of the on-off actions of the contact of the clock-pulse generator 4 or the push button switch of the hand microphone 6 can be transmitted and digitally counted. On the other hand, after the lapse of the above predetermined time, pulses are continuously transmitted to the up-down counter if the above contact or push button switch is kept closed. Thus the hand microphone 6 can remotely control the increase or decrease of the channel number either by one-by-one shift or by quick shift.

As mentioned above, the logic system 1 is composed mainly of a digital-number generating circuit and a selected-channel coding circuit; it can be made in a highly integrated configuration and extremely compact; especially when applied to the multi-channel selection of a transceiver provided with the automatic frequency control of phase-locked loop type, it can achieve the automatic, manual or remote-controlled one-by-one shift or quick shift of the channel number very easily during the channel selection operation while watching the digital indication of the indicator.

Figure 2:
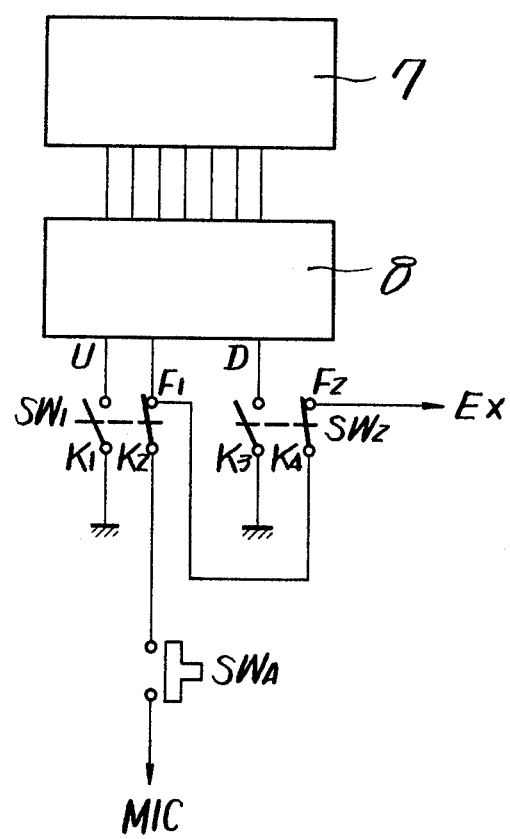
FIG. 2 is a block diagram of an example of the jamming-wave inhibiting circuitry according to the present invention.

Next, reference is made to FIG. 2 which shows an example of the jamming-wave inhibiting circuitry according to the present invention.

Reference numeral 7 designates a variable frequency divider of a PLL (phase-locked loop) frequency synthesizer formed as a logic system similar to the logic system 1 shown in FIG. 1. This logic system also contains a scanner 8 acting as a clock-pulse generating section for scanning. Movable contacts $K_1$ and $K_3$ are connected to the scanner 8 so that channel-selection input signals, i.e., channel-switching inputs U and D for respectively increasing and decreasing the channel number may be applied to the scanner 8. Movable contacts $K_2$ and $K_4$ are also provided which are differentially interlocked with the contacts $K_1$ and $K_3$ respectively. When either of the contacts $K_1$ or $K_3$ provided in the channel-selection input lines is closed, either of the contacts $K_2$ or $K_4$ is kept opened without fail. The contacts $K_1$ and $K_3$ are collectively referred to as a switch $SW_1$ and the contacts $K_2$ and $K_4$ as a switch $SW_2$. These switches are provided instead of the clock-pulse generator 4 shown in FIG. 1. In addition, a fixed contact $F_1$ relative to the movable contact $K_2$ is connected in series to the movable contact $K_4$, and the movable contact $K_2$ is connected to a hand microphone MIC through a push-button switch $SW_4$. Moreover, a fixed contact $F_2$ relevant to the movable contact $K_4$ is connected to a switch or circuit Ex for switching transmission and reception.

In operation, when the contact $K_1$ of the switch $SW_1$ is closed to give the scanner 8 a channel-number-increasing input, the interlocking contact $K_2$ is kept opened during channel-selecting operation and therefore a transmission output circuit Ex is kept in a cut-off state even if a press-to-talk button switch attached to the hand microphone MIC is kept depressed with the result that no transmission output is produced during this time. As a matter of course, the same effects may be expected as those mentioned above when a channel-number-decreasing input is given to the scanner 8.

Thus, according to the above example of the present invention, the auxiliary contacts, which are interlocked with and differentially operated with the contacts provided in the channel-selecting input circuit, are positioned off the channel-selecting input circuit. Therefore the device can be made very simple in construction and, in addition, the transmission output circuit is completely kept in the cut-off state during the channel-selecting operation in which channel-selecting signals are given to the scanner, and therefore no jamming wave is generated.

Figure 3:
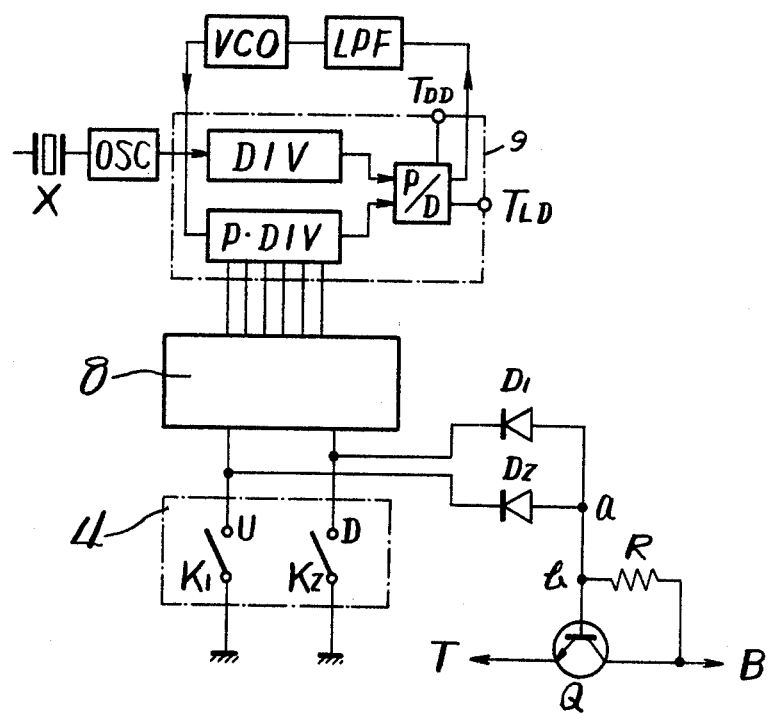
FIG. 3 is a block diagram of another example of the jamming-wave inhibiting circuit of the present invention.

Next, reference is made to FIG. 3, which shows another example of the jamming-wave inhibiting circuitry.

Reference numeral 9 designates an IC system which contains a fixed frequency divider DIV, a variable frequency divider P.DIV, and a phase detector P/D for comparing the phases of divided frequencies to the fixed and variable frequency dividers DIV and P.DIV to obtain frequency difference therebetween and applying the frequency difference to a control voltage oscillator VCO; the fixed and variable frequency dividers DIV and P.DIV and the phase detector P/D being formed into an integrated circuit configuration. The PLL system is usually kept unlocked during a switching period for channel selection; in this connection, a lock detection terminal $T_{LD}$ is provided at the IC system 9 so as to discriminate the locked state from the unlocked state. The IC system 9 is connected to a scanner 8. The scanner 8 is also provided with terminals to which channel-number increasing and decreasing input signals U and D are applied respectively. A clock-pulse generator 4 is provided which has movable contacts $K_1$ and $K_2$ relevant to the above terminals respectively. Thus the clock-pulse generator 4 gives the above terminals the channel-number increasing or decreasing signal according to the closing of the movable contact $K_1$ and $K_2$. The above channel-number increasing and decreasing terminals are connected to diodes $D_2$ and $D_1$, respectively, so that current may flow toward them. A common terminal of the anodes of the diodes $D_1$ and $D_2$ is connected to the base terminal of transistor Q whose collector and emitter are connected to a power source B and the input stage T of a reception circuit respectively.

In operation, when either of the movable contact $K_1$ or $K_2$ is closed for channel selection, a normal channel-selecting operation is achieved. Meanwhile, the base terminal b of the transistor Q is grounded through the diode $D_1$ or $D_2$ and the contact $K_2$ or $K_1$, and therefore its potential is lowered to finally reach a level corresponding to the voltage drop determined by the resistance of the diode $D_1$ or $D_2$ in the forward direction. Consequently, the transistor Q is held at cutoff and thus no input is applied to the transmission stage.

The lock detection terminal $T_{LD}$ of the IC system 9 is connected to the bias terminal or power source of the amplifier, mixer or crystal oscillation circuit in the transmission stage. Since the transmission circuit is so formed that it may be cut off when the PLL system becomes unlocked during the channel selection period, the lock detection terminal $T_{LD}$ can also be used for cutting off the bias voltage or power source of the above-mentioned amplifier, mixer, etc., by the aid of the transistor or a switching element mentioned above, that is, for cutting off the input to the transmission stage.

When the above-mentioned contacts $K_1$ and $K_2$ are disengaged from the channel-selecting signal input terminals, that is, when no channel-selecting signal input is applied, the transistor Q is held in conduction since a base current is given thereto from the power source B through an emitter-base resistor R, permitting transmission and reception through the selected channel.

Thus, during the period when the desired channel is being selected, the circuit to the transmission stage is cut off thereby preventing the transmission of jamming waves. The hand microphone is usually connected to the channel-selecting signal input terminals, and therefore even when the press-to-talk button switch is kept depressed, no jamming wave will be transmitted since the transistor, i.e., a switching element is held at cutoff as mentioned above.

Thus, according to the above example of the present invention, the switching element provided on the line between the the channel-selecting signal input terminals and the transmission circuit are connected to the diodes arranged in the reverse direction so that the input to the transmission stage may be stopped when the channel-selecting signals are applied, and therefore the channel-selecting device can be mounted on an existing transceiver easily and within a very little space and completely eliminates the accidental transmission of jamming waves during the channel selecting period. Accordingly, great practical effects can be expected.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. In a transceiver for transmission and reception over a radio channel, a channel selecting device comprising:
   display means for indicating a selected channel number;
   actuatable logic means for shifting the channel number at a variable rate during a first time interval and at a fixed rate thereafter and generating instruction signals to control the display means;
   channel selection means for actuating the logic means and controlling the shifting rate during the first time interval; and
   time constant means for establishing the length of the first time interval.

2. In a transceiver for transmission and reception over a radio channel and having a transmission line for transmission output, a channel selecting device comprising:
   a channel scanner;
   means operated by the scanner for shifting the channel;
   switch means for applying channel number shifting input signals to the scanner; and
   means interlocked with the switch means and adapted to be interposed in the transmission line for opening the transmission line during the period when channel shifting input signals are applied to the scanner.

3. In a transceiver for transmission and reception over a radio channel and having a transmission line for transmission output, a channel selecting device comprising:
   a channel scanner;
   means operated by the scanner for shifting the channel;
   switch means for applying channel number shifting input signals to the scanner;
   actuatable means adapted to be interposed in the transmission line for opening the transmission line; and
   rectifier means connected to the switch means and responsive to the application of channel number switching input signals to the scanner for actuating the transmission line opening means.

* * * * *